United States Patent [19]

Lou et al.

[11] 3,911,444

[45] Oct. 7, 1975

[54] METAL FILM RECORDING MEDIA FOR LASER WRITING

[75] Inventors: David Yuan Kong Lou, Chatham; Hugh Alexander Watson, Berkeley Heights; Ronald Howard Willens, Warren Township, Somerset County, all of N.J.

[73] Assignee: Bell Telephone Laboratories, Incorporated, Murray Hill, N.J.

[22] Filed: Apr. 4, 1974

[21] Appl. No.: 457,788

[52] U.S. Cl. ........................ 346/1; 117/8; 346/76 L; 346/135

[51] Int. Cl.$^2$ ........................................ G01D 15/34

[58] Field of Search ........... 346/135, 76 L, 1; 117/8, 117/201, 211, 217

[56] References Cited

UNITED STATES PATENTS

| | | | |
|---|---|---|---|
| 3,560,994 | 2/1971 | Wolff et al. | 346/135 |
| 3,665,483 | 5/1972 | Becker et al. | 346/135 X |
| 3,720,784 | 3/1973 | Maydan et al. | 346/76 L X |

OTHER PUBLICATIONS

Greenblott, B. J., High–Density Information Recording by Vaporization of Film Areas, IBM Tech. Disc. B., Vol. 14, No. 8, Jan. 1972, p. 2358.

*Primary Examiner*—Joseph W. Hartary
*Attorney, Agent, or Firm*—P. V. D. Wilde; G. S. Indig

[57] ABSTRACT

Thin metal film systems supported on transparent substrates are described for use in laser micromachining of high resolution facsimile images. The disclosed systems, which include a specific plastic film undercoating interposed between the metal film and the transparent substrate, require less energy for micromachining than metal films of equal optical opacity. The plastic film also acts as a barrier which reduces interaction between impurities in the substrate and the metal film.

6 Claims, 4 Drawing Figures

METAL FILM RECORDING MEDIA FOR LASER WRITING

BACKGROUND OF THE INVENTION

1. Field of the Invention

The invention relates to a recording system, and, in particular, to one in which information is recorded with a laser in a radiation absorbing film.

2. Description of the Prior Art

Improvements in apparatus for recording information have been described by D. Maydan, M. I. Cohen, and R. E. Kerwin in U.S. Pat. No. 3,720,784, issued Mar. 13, 1973. In that patent is described apparatus capable of forming a large number of short duration amplitude-modulated pulses of spatically coherent radiation to create positive or negative pictorial images. The images consist of a pattern of small discrete holes in a thin radiation absorbing film. The preferred radiation absorbing film comprises a thin layer of bismuth (e.g., about 500 Angstroms) deposited on a polyester substrate such as Mylar (trademark of E. I. DuPont de Nemours and Co., Inc.). In one typical mode of operation, the short laser pulses evaporate a small amount of the film in the center of the spot upon which the beam is incident and melt a large area around this region. Surface tension then draws the melted material toward the rim of the melted area, thereby displacing the film from a nearly circular region of the transparent substrate. By varying the amplitude of the very short laser pulses, the diameter of the region that is melted can be varied, and the area of the hole increases monotonically with increasing pulse amplitude. The holes are formed in parallel rows with the centers of the holes equally spaced along each row and from row to row. The largest holes are of diameters nearly equal to the center-to-center spacing of the holes. In this way, it is possible to achieve a wide range of shades of grey. The apparatus is particularly useful for recording graphic copy or images that are transmitted over telephone lines, such as from facsimile transmitters.

Various improvements have been made to reduce the energy required for laser machining. For example, U.S. Pat. No. 3,560,994, issued Feb. 2, 1971, to K. Wolff and H. Hamisch, teaches that the properties of a bismuth recording medium are improved by interposing a layer of an organic material between the metal film and the substrate. However, the organic compositions, an example of which is given as a highly nitrified cellulose lacquer, dissociate and release a gaseous compound.

SUMMARY OF THE INVENTION

In accordance with the invention, film systems which include a plastic film interposed between the radiation absorbing film and the transparent substrate require less energy to micromachine than films without this plastic film. Preferred embodiments are the poly-alkyl methacrylates, in particular, n-butyl methacrylate and isobutyl methacrylate, as the plastic film. The plastic undercoating also prevents inpurity transfer between the substrate and the radiation absorbing film, and remains intact during the micromachining.

Detailed Description of the Invention

Figure 1:
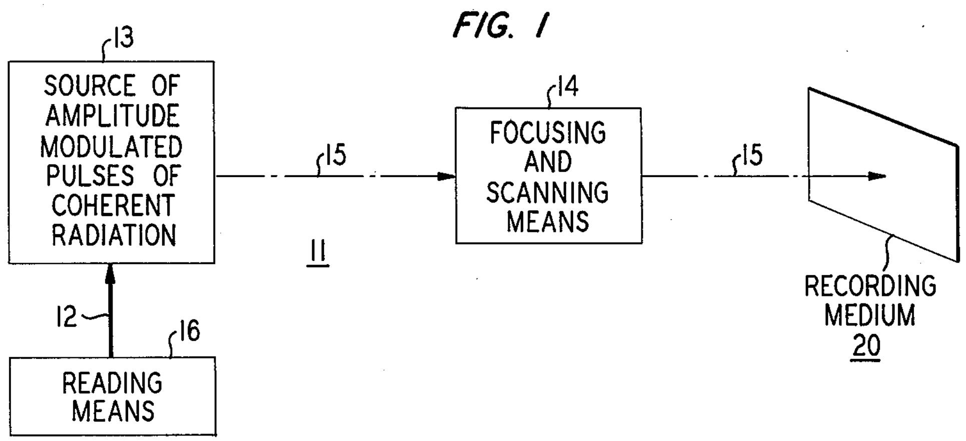
FIG. 1 depicts in block form illustrative apparatus used to record information on a metal film by laser writing.

Apparatus 11 used for laser micromachining of thin metal films is schematically represented in FIG. 1. The apparatus comprises a source 13 of optical pulses of spatically coherent radiation, which are amplitude-modulated in accordance with a received signal 12 and focusing and scanning means 14 for writing on a recording medium 20 with these optical pulses. Source 13 of optical pulses illustratively includes an intracavity laser modulator, such as that described by D. Maydan in U.S. Pat. No. 3,703,687, issued Nov. 21, 1972. Also shown in FIG. 1 is reading means 16, which may or may not be associated in close proximity with the foregoind components.

Reading means 16 provides a facsimile signal by scanning an object whose image is to be recorded on recording medium 20. Typical objects are a picture, an X-ray, a chart, a plot, a page of writing, a page of a book, a microfilm image, a portion of newspaper print, and a three-dimensional object. By illuminating the object or portions of the object and by detecting the relative intensity of the light reflected or scattered from the object in a time sequential manner, it is possible to "read" and form a facsimile signal representative of the object. An example of such reading means 16, or facsimile transmission apparatus, is disclosed in a patent application by H. A. Watson, entitled "Compact Flatbed Page Scanner", Ser. No. 445,051, filed Feb. 25, 1974, now U.S. Pat. No. 3,867,569.

To write an image of the scanned object on recording medium 20, an electrical signal representative of the image is transformed into beam 15 of amplitude-modulated pulses of coherent optical radiation, which are short in duration compared with the time interval between pulses. Beam 15 is then focused onto the medium and scanned across it by focusing and scanning means 14.

Figure 2A:
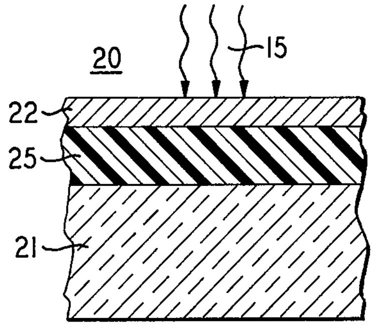
FIGS. 2A and 2B are fragmentary cross-sectional views depicting alternate methods of recording information on a metal film supported on a substrate.
Figure 2B:
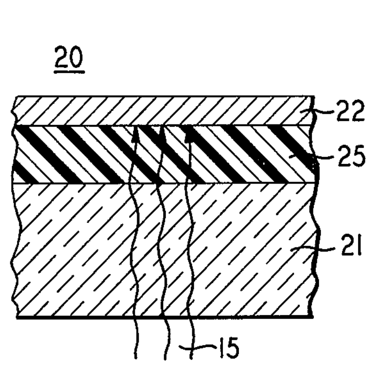

As shown in FIGS. 2A and 2B, the recording medium 20 comprises a radiation absorbing film, or metal film, 22 on a transparent substrate 21. Each focused pulse of coherent radiation 15 heats up a very small discrete region of the film 22. If the temperature for any part of the region on which the laser pulse is incident reaches the boiling point of the film or if a sufficiently large area is melted, a hole or crater is formed in the film. The size of the hole that is formed increases monotonically with increasing energy density of the laser pulse. The holes are located in parallel rows with the centers of the holes equally spaced along each row and from row to row. The largest holes are of diameter nearly equal to the center-to-center spacing of the holes. As a consequence, such films may, under the proper conditions, yield a useful grey scale in the image recorded.

The Maydan et. al U.S. Pat. No. 3,720,784 describes a preferred recording medium comprising a thin radiation absorbing film off bismuth supported on a transparent polyester substrate. In accordance with the present invention, a reduction in laser energy required for micromachining these films is obtained by forming a plastic film, or layer, 25 between the radiation absorbing film 22 and the transparent substrate 21. The plastic film also acts as a barrier which reduces the interaction between impurities in the substrate and the metal film. The system may be either front machined as shown in FIG. 2A or back machined as shown in FIG. 2B.

Deposition of the radiation absorbing film 22 is conveniently performed by well-known vacuum evaporation procedures. Deposition of the plastic film 25 may be done by a variety of techniques readily apparent to the practitioner.

The plastic film 25 preferably should provide a surface which enhances the laser machining properties of the recording medium and should provide a barrier to any impurities in the polyester substrate 21 that might promote chemical or electrochemical attack to the radiation absorbing film 22. A thin film of a poly-alkyl methacrylate, in particular, either iso-butyl methacrylate or n-butyl methacrylate, exhibits these properties, and accordingly is preferred. Deposition of the plastic film is conveniently achieved by dipping the substrate in a solution of the plastic and a solvent, such as methyl ethyl ketone, and allowing the solvent to evaporate. Other films, such as methyl methacrylate, titanium dioxide and fluorinated ethylene polymer, have been investigated. However, these films in general require more elaborate deposition procedures than do the preferred films or do not enhance the laser machining properties of the recording medium to the extent that the preferred films do.

The range in metal film thickness depends first on the necessity of forming a film thick enough to be continuous and opaque, with an optical density of about 1 to 3, and second on the need to form a film thin enough to laser machine at as low an energy as possible. For back machining, the plastic films should be thin enough to be substantially transparent to the laser radiation. For both front and back machining, the plastic film should be thick enough to provide a smooth continuous covering of the substrate. Consistent with these considerations, the thickness of metal films may range from about 100 Angstroms to 1000 Angstroms, and the thickness of plastic films may range from about 0.1 micrometers to 20 micrometers.

Figure 3:
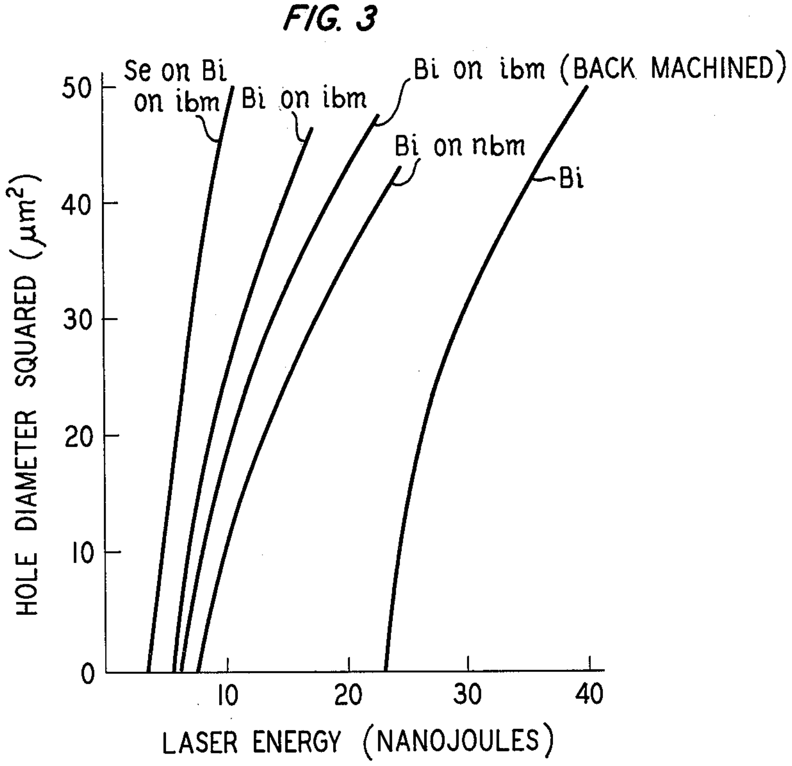
FIG. 3 illustrates, on coordinates of hole diameter squared (in $\mu m^2$) and laser energy (in nJ), the energy required for micromachining holes in various metal film recording media.

FIG. 3 is a plot of hole diameter squared produced in a radiation absorbing film as a function of applied laser energy from a laser having a beam diameter of 8 μm, a pulse duration of 30 nsec, and operating at a wavelength of 1.06 μm. There, the improved characteristics of using a film of iso-butyl methacrylate (ibm) or n-butyl methacrylate (nbm) in accordance with the invention may be seen. The plastic films described in FIG. 3 and in the Table below were deposited on the substrate by dipping the substrate in a solution of 6.2 percent by weight of the plastic in methyl ethyl ketone. In all cases the substrate is a flexible polyester film, here Celanar (trademark of Celanese Plastics Co.). Except for the one indicated, the curves illustrate results obtained by front machining. A bismuth radiation, absorbing film without a plastic film interposed between the metal film and the substrate is included for comparison.

The Table below lists measurements obtained by laser micromachining several examples of metal film recording media. The recording media examples are identified in terms of the component in each layer and the layer thickness in Angstroms, with the final component listed being formed on the substrate. Some of the recording media examples include a thin film of methyl methacrylate formed on the exposed surface of the metal film. The advantages of employing this plastic film overcoating are taught in the concurrently filed patent application of R. H. Willens, entitled "Metal Film Recording Media for Laser Writing," Ser. No. 457,975, filed Apr. 4. 1974 and now abandoned. Listed in the Table is the threshold pulse machining energy required for a laser beam of diameter 8 μm and pulse duration of 30 nanoseconds from a neodymium-doped yttrium aluminum garnet laser. Also listed is the pulse energy needed to machine a hole 6 μm in diameter and the optical transmission through the film at 6328 Angstroms. The recording media examples are listed in the Table in order of increasing threshold machining energy. It can be seen that the metal film recording media in accordance with the invention require less energy to micromachine.

TABLE.

LASER MICROMACHINING OF METAL FILM RECORDING MEDIA

| System | Substrate | Front/Back Machine | Threshold Energy, nJ | Energy Required to Machine a 6-μm Hole, nJ | % Transmission |
|---|---|---|---|---|---|
| 770 Se/460 Bi | ibm/Cel | F | 3.4 | 8.4 | 0.88 |
| 750 Se/420 Bi | nbm/Cel | F | 4.0 | 8.7 | 1.17 |
| 500 Bi | ibm/Cel | B | 5.5 | 14 | 0.7 |
| 800 Se/600 Bi | Cel | F | 5.7 | 19.5 | 0.22 |
| 500 Bi | ibm/Cel | F | 6.7 | 17.6 | 0.7 |
| 525 Bi | nbm/Cel | F | 8.1 | 21 | 0.4 |
| mm/510 Bi | ibm/Cel | F | 8.6 | 20 | 0.96 |
| mm/780 Se/460 Bi | ibm/Cel | F | 9 | 24 | 1.28 |
| mm/620 Bi | Cel | F | 20 | 38 | 1 |
| Bi | Cel | F | 23 | 31 | 1 |

What is claimed is:

1. A method for recording information in a metal film recording medium by selectively removing portions of a thin radiation absorbing film supported on a flexible transparent substrate, the method comprising exposing the radiation absorbing film to modulated coherent radiation of sufficient energy and duration to remove the portions, and CHARACTERIZED IN THAT the recording medium has a plastic layer of a poly-alkyl methacrylate interposed between the substrate and the radiation absorbing film.

2. A metal film recording medium for recording information by exposure of the medium to a laser beam, the medium comprising a flexible transparent substrate and a metal radiation absorbing film formed on the substrate, CHARACTERIZED BY a plastic film of poly-alkyl methacrylates interposed between the substrate and the metal film.

3. The medium of claim 2 in which the plastic film is iso-butyl methacrylate or n-butyl methacrylate.

4. the medium of claim 2 in which the plastic film ranges from about 0.1 micrometers to 20 micrometers in thickness.

5. The medium of claim 2 in which the metal film ranges from 100 Angstroms to 1000 Angstroms in thickness.

6. The medium of claim 2 in which the transparent substrate is a polyester film.

* * * * *